UNITED STATES PATENT OFFICE.

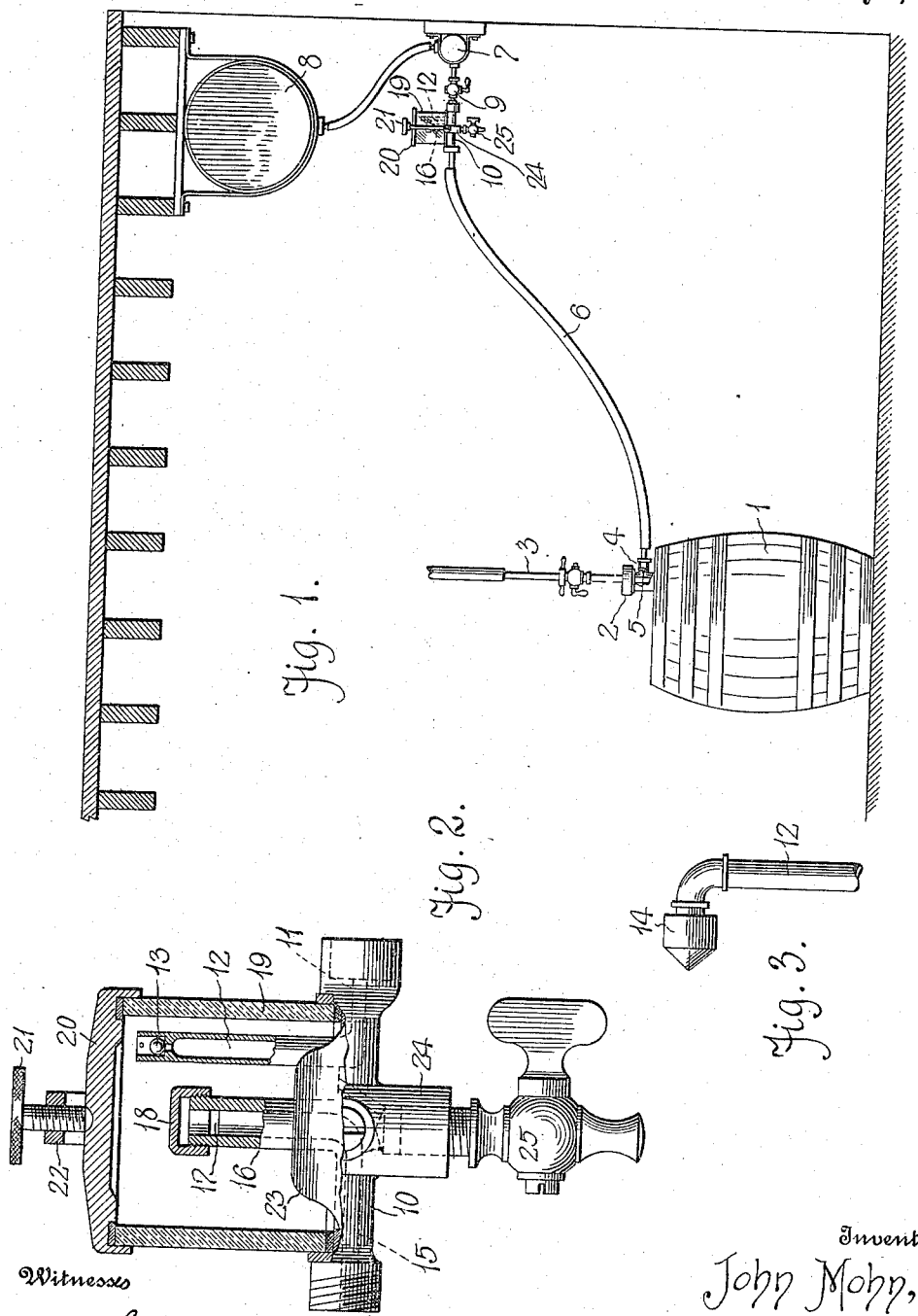

JOHN MOHN, OF DETROIT, MICHIGAN.

INDICATING DEVICE.

1,224,949. Specification of Letters Patent. Patented May 8, 1917.

Original application filed August 29, 1913, Serial No. 787,256. Divided and this application filed January 17, 1916. Serial No. 72,398.

*To all whom it may concern:*

Be it known that I, JOHN MOHN, a citizen of the United States of America, residing at Detroit, in the county of Wayne and State of Michigan, have invented certain new and useful Improvements in Indicating Devices, of which the following is a specification, reference being had therein to the accompanying drawings.

This is a divisional application in connection with my application for patent, filed Aug. 29, 1913, Serial No. 787,256 for certain improvements in a safety trap for liquid dispensing apparatus. In the parent application there is shown and described a trap which has a float actuated valve, and the present invention relates to a trap which will serve the same purposes without a float actuated valve, consequently there is a material reduction in the cost of manufacture, less parts to clean and assemble, and in practice the indicating device and trap forming the subject matter of this application has been found just as efficient.

My invention will be better understood when reference is had to the drawing and the detail description thereof, and in the drawing, Figure 1 is an elevation of a beer dispensing apparatus provided with an indicating device and trap in accordance with my invention;

Fig. 2 is a side elevation of the indicating device and trap, partly broken away and partly in section, and Fig. 3 is a side elevation of a check valve which may be used in connection with the indicating device.

As illustrating a conventional form of beer dispensing apparatus, there is shown a suitable receptacle, as a barrel 1, provided with the usual tap 2, tube 3, air inlet connection 4, and check valve 5 at said connection, said check valve being of the well known "Thomas" type. The connection 4 has a hose 6 in communication with an air distributing pipe 7 of a tank 8, said tank containing air under pressure. An ordinary valve 9 controls the supply of air to the barrel 1 and so long as the check valve 5 is in perfect working order beer can be dispensed in the usual way.

It very often happens however, that the check valve 5 becomes worn and is rendered inoperative, consequently beer or foam therefrom enters the hose 6 and often enters the tank 8 befouling all of the air line connections by reason of slime adhering to the walls of such conduits. The disadvantages and labor incurred by failure of the check valve 5 are well known to dispensers of beer and other beverages and such conditions ordinarily cannot be detected except by bad tasting beer rendered so by the air under pressure impinging the slimy walls of the hose 6 and other connections.

To be able to immediately detect such conditions and prevent beer from entering the distributing pipe 7 of the tank 8 is the principal object of my invention, which is attained by installing an indicating device and trap adjacent the valve 9. The indicating device and trap comprises a base 10 rigidly supported by the valve 9 and having a port 11 in communication with said valve. The port 11 is also in communication with an upright air outlet pipe 12 having a conventional form of ball check valve 13 at the upper end thereof. In lieu of this ball check valve a flap check valve 14, shown in Fig. 3, may be used.

The base 10 has another port 15 in communication with the hose 6 and said port is also in communication with a central upright tube 16 carried by the base 11. The upper end of the tube 16 has a lateral opening 17 and a cap 18.

Suitably mounted upon the base 10 is a cylinder or casing 19, preferably made of a piece of glass tube. The cylinder 19 has the upper end thereof closed by a cap 20 held in place by a clamping screw 21 forming part of a yoke 22 pivotally held by diametrically opposed sides of the base 10.

The base 10 has a displacement boss 23 within the cylinder or casing 19 and the bottom of said base has a connection 24 for a drain cock 25, said drain cock being in communication with the cylinder or casing 19 whereby beer or liquid may be drained from off of the base when cleaning the device.

Any defect in connection with the check valve 5 by which beer or other liquid is not excluded from the connection 4 allows beer to enter the hose 6 and eventually back up in the tube 16, pass through the opening 17 and accumulate in the bottom of the cylinder or casing 19, where it can be seen to indicate that there is an imperfection in connection with the check valve 5. It is then the duty of the attendant of the beer dispensing apparatus to thoroughly clean all connections between the barrel 1 and the valve 9 before tapping another barrel of beer. A small quantity of beer entering the indicating device does not, however, interfere with dispensing the contents of the barrel, as the check valve 13 allows air from the tank 8 to enter the cylinder or casing 19, pass through the opening 17 and the tube 16 to the hose 6 and serve its purpose upon the beer within the barrel 1 until the barrel is empty. The check valve 13 is principally used to prevent beer from entering the pipe 12, valve 9, distributing pipe 7 and the tank 8. Sometimes, when tapping a fresh barrel of beer the pressure of gas on the beer within the barrel is so great as to force beer through the check valve that is in the least way defective and if it were not for the emergency check valve 13, the beer might go as far as the tank 8 and cause no end of trouble when cleaning the apparatus.

Since the yoke 22 can be swung to one side, the cap 20 removed, and then the cylinder or casing 19, easy access can be had to each and every part of the beer dispensing apparatus and thoroughly cleansed. During such operation the valve 9 is closed to preserve air in the tank 8.

From the foregoing it will be observed that I have devised novel means for detecting imperfections in the ordinary valve associated with a beer tap, and while such imperfections may be indicated, still the dispensing of beer may be continued until the package containing the same is empty.

What I claim is:—

A combined indicating device and trap for liquid dispensing apparatus, comprising a base having ports therein one of which is adapted to receive air and the other of which is adapted to discharge air, a transparent casing on said base, a cap on said casing, a yoke carried by said base and extending over said cap, clamping means carried by said yoke for holding said cap on said casing, a pipe in said casing communicating with the air inlet port of said base, a check valve carried by said pipe, and an apertured tube in said casing in communication with the air outlet port of said base.

In testimony whereof I affix my signature in presence of two witnesses.

JOHN MOHN.

Witnesses:
ANNA M. DORR,
KARL H. BUTLER.